United States Patent
Gerst et al.

(10) Patent No.: US 9,221,138 B2
(45) Date of Patent: Dec. 29, 2015

(54) TOOL CHANGERS FOR CHANGING TOOLS ON SPINDLES OF MACHINE TOOLS AND MACHINE TOOLS COMPRISING SUCH TOOL CHANGERS

(75) Inventors: Manuel Gerst, Bielefeld (DE); Michael Bergbaur, St. Marein/Graz (AT)

(73) Assignee: GILDEMEISTER AKTIENGESELLSCHAFT, Bielefeld (DE)

( * ) Notice: Subject to any disclaimer, the term of this patent is extended or adjusted under 35 U.S.C. 154(b) by 1161 days.

(21) Appl. No.: 13/116,748

(22) Filed: May 26, 2011

(65) Prior Publication Data

US 2011/0319239 A1 Dec. 29, 2011

(30) Foreign Application Priority Data

May 31, 2010 (DE) .......................... 10 2010 029 530

(51) Int. Cl.
*B23Q 3/157* (2006.01)
*B23Q 3/155* (2006.01)

(52) U.S. Cl.
CPC ........ *B23Q 3/15706* (2013.01); *B23Q 3/15506* (2013.01); *Y10T 483/179* (2015.01); *Y10T 483/1795* (2015.01); *Y10T 483/1882* (2015.01)

(58) Field of Classification Search
CPC ............. B23Q 3/15506; B23Q 3/1556; B23Q 3/15706; Y10T 483/1752; Y10T 483/1755; Y10T 483/1757; Y10T 483/176; Y10T 483/179; Y10T 483/1793; Y10T 483/1795; Y10T 483/1798; Y10T 483/1873; Y10T 483/1882
USPC ........... 483/38, 39, 40, 41, 54, 55, 56, 57, 66, 483/67
See application file for complete search history.

(56) References Cited

U.S. PATENT DOCUMENTS 3,473,419 A * 10/1969 Ollearo ........................... 408/35
4,135,278 A * 1/1979 Kitamura ...................... 29/26 A (Continued)

FOREIGN PATENT DOCUMENTS

DE 1 552 408 1/1970
EP 0 577 850 A1 1/1994

(Continued)

OTHER PUBLICATIONS

German Patent and Trademark Office, "Office Action," issued in connection with German Application No. 102010029530.2-14, Jan. 19, 2011 (10 pages).

(Continued)

*Primary Examiner* — Erica E. Cadugan
*Assistant Examiner* — Michael Vitale
(74) *Attorney, Agent, or Firm* — Hanley, Flight & Zimmerman, LLC

(57) ABSTRACT

A disclosed example tool changer for changing a tool on a spindle of a machine tool comprises a tool drum having a plurality of tool holders to hold tools. The example tool changer also includes an axle carrier on which the tool drum is rotatably supported to align the tool holders with the spindle. A first coupling portion is rotatably supported on the axle carrier. At least one first gear stage is provided via which the first coupling portion is connected to the tool drum. The first coupling portion is adapted to be coupled or uncoupled with a second coupling portion rotatably supported on a spindle stock of the machine tool and connected to the spindle of the machine tool via at least one second gear stage. The tool drum is adapted to be driven, when the first and second coupling portions are in a coupled state, by the spindle of the machine tool via the at least one second gear stage, the second and first coupling portions and the at least one first gear stage to align the tool holders.

23 Claims, 7 Drawing Sheets

(56) References Cited

U.S. PATENT DOCUMENTS

| | | | |
|---|---|---|---|
| 4,237,595 A * | 12/1980 | Kitamura | 29/26 A |
| 4,813,122 A * | 3/1989 | Watanabe et al. | 483/57 |
| 4,835,838 A * | 6/1989 | Hirose | 483/47 |
| 4,870,744 A | 10/1989 | Araki et al. | |
| 5,020,210 A * | 6/1991 | Fujimoto | 483/54 |
| 7,575,542 B1 * | 8/2009 | Sun et al. | 483/39 |

FOREIGN PATENT DOCUMENTS

| | | |
|---|---|---|
| EP | 1 652 617 A1 | 5/2006 |
| EP | 1 839 806 A1 | 10/2007 |
| GB | 2024055 | 1/1980 |
| JP | 59019648 | 2/1984 |
| JP | 60205058 A | 10/1985 |

OTHER PUBLICATIONS

European Patent Office, "Search Report," issued on Oct. 11, 2011, in European Patent Application No. 11167842.1, 9 pages.

European Patent Office, "Exam Report," issued on Oct. 22, 2012, in European Patent Application No. 11167842.1, 9 pages.

\* cited by examiner

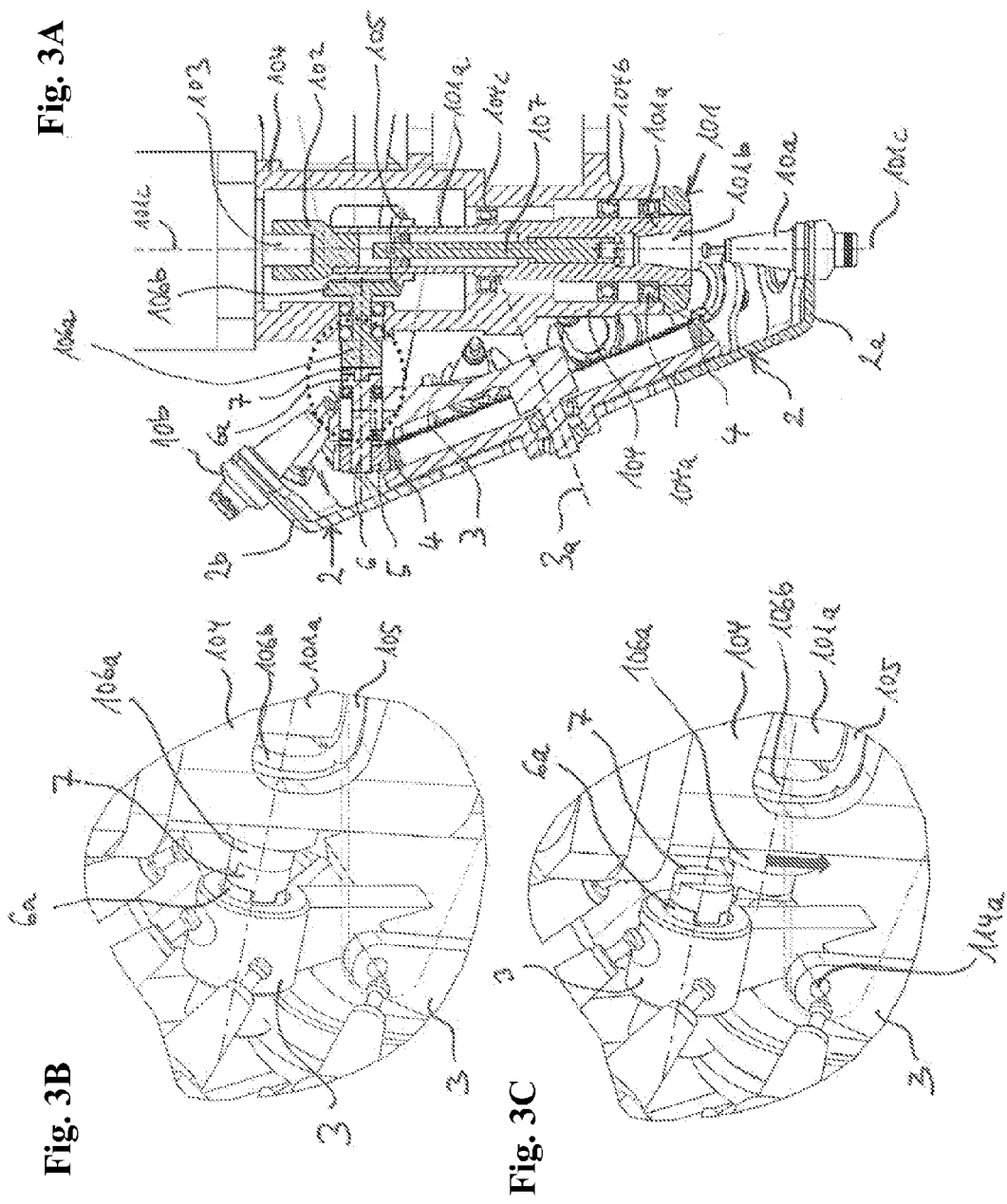

TOOL CHANGERS FOR CHANGING TOOLS ON SPINDLES OF MACHINE TOOLS AND MACHINE TOOLS COMPRISING SUCH TOOL CHANGERS

RELATED APPLICATIONS

This patent claims priority to German Patent Application No. 10 2010 029 530.2, filed on May 31, 2010, which is hereby incorporated by reference herein in its entirety.

FIELD OF THE DISCLOSURE

The present disclosure relates generally to machine tools and, more particularly, to tool changers for changing tools on spindles of machine tools and machine tools comprising such tool changers.

BACKGROUND

Tool changers for changing a tool on a spindle of a machine tool are known from the prior art, see e.g. EP 577 850 A1, EP 1 652 617 A1 and EP 1 839 806 A1. Such tool changers comprise a tool drum having a plurality of tool holders disposed on the circumference of the tool drum for holding tools, and an axle carrier on which the tool drum of the tool changer is rotatably supported for aligning the tool holders with the spindle by rotating the tool drum. The alignment by rotating the tool drum and the driving of the rotation of the tool drum, respectively, for aligning the tool holders with the spindle is performed by the spindle of the machine tool so that no additional drive has to be provided.

Thus, the drum rotation of the tool drum and the positioning of the tool holders with the spindle required for the tool selection is performed by the main spindle drive, wherein a spindle gear attached to the spindle at a tool changing position of the tool changer relative to the spindle stock of the machine tool meshes with a gear of the tool changer and effects a rotation of the tool drum by rotating the spindle.

However, as the torque of the main spindle drive of a machine tool required for rotating the drum is usually in a high rotational speed range, the speed reduction of such gear drive will not suffice to drive the tool drum for rotatably aligning the tool holders. For this reason, a step-down gear, which is formed as a cam step-down gear, is additionally integrated in the tool drum in the prior art.

EP 1 652 617 A1, for example, shows a cam step-down gear comprising a driving plate having a ball driving groove, and a driven plate which also has a cam driving groove. Furthermore, a ball guide having radial ball guiding openings is provided between the driving plate and the driven plate.

Due to the different designs of the respective ball-driven grooves of the driving plate and the driven plate, a speed reduction is achieved by effecting a radial movement of the balls in the radial ball openings of the ball guide by rotating the driving plate, the radial movement of the balls in the radial ball openings then being converted into a rotary movement of the driven disk at a reduced speed. In this case, the driving plate is driven by the spindle of the machine tool via a gear transmission, and the driven plate is connected to the tool drum in a rotationally fixed manner such that the driving of the driving plate effects a rotational movement of the tool drum at a reduced speed. Such cam step-down gear is known, for example, from JP 60205058.

However, such tool changers having a cam step-down gear of the above-described type have various drawbacks. On the one hand, the structure of such cam step-down gear is cumbersome and space-consuming because the driving disk, the central ball guide and the driven disk must be provided with a large circumference. Furthermore, due to the transmission of a rotational movement into a radial movement of the balls into another rotational movement, a high friction effect is caused which must be overcome by the spindle drive and furthermore leads to increased wear. Moreover, for driving the tool drum by means of the spindle of the machine tool it is necessary to provide an exposed spindle gear in the work space of the spindle, that is, in the range of the tool holder of the spindle, via which the driving disk of the cam step-down gear is driven.

BRIEF DESCRIPTION OF THE DRAWINGS

FIGS. 3A, 3B, and 3C show schematic details of the coupling of first and second coupling means according to the first example.

DETAILED DESCRIPTION

Figure 1:
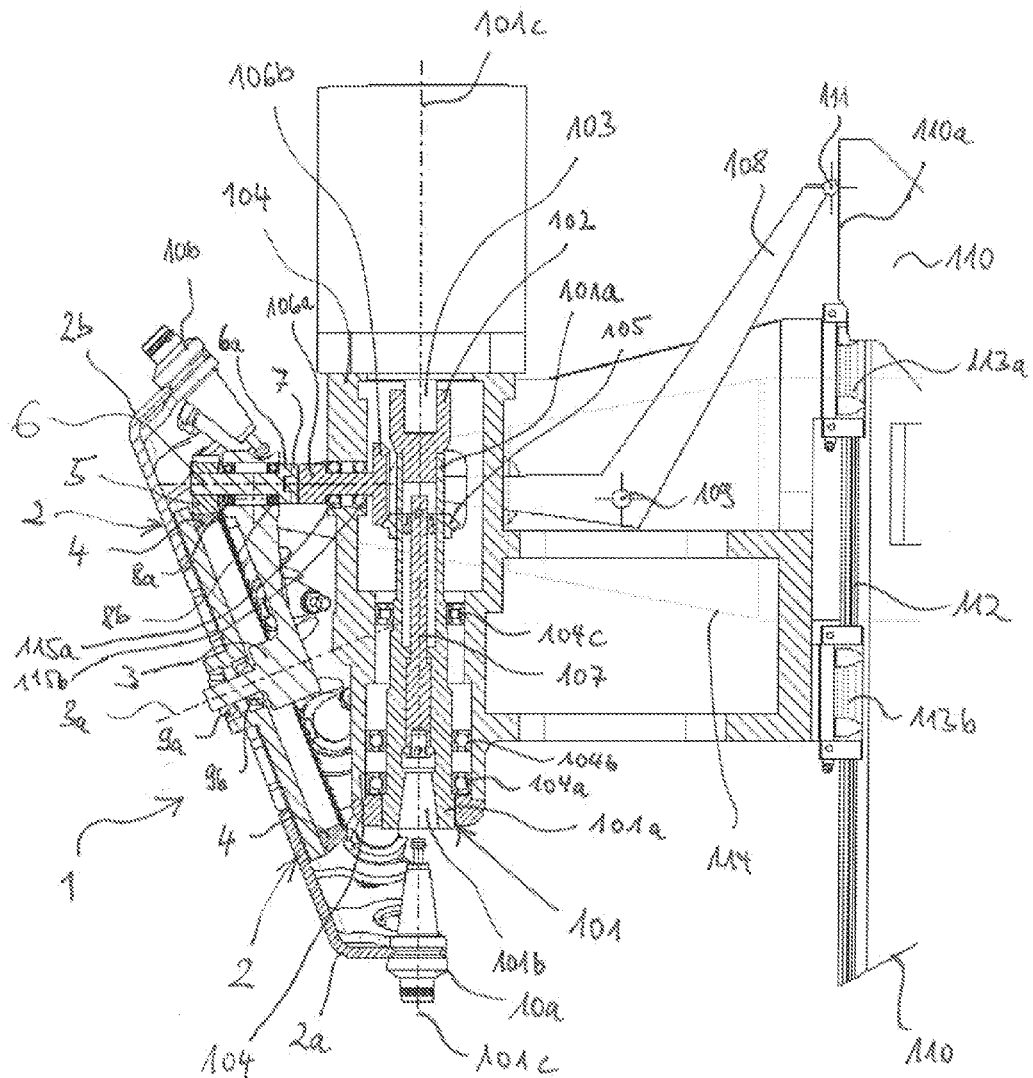
FIG. 1 shows a schematic partial sectional view of a tool changer according to a first example of examples disclosed herein.

Below, disclosed examples are described in detail with reference to the attached Figures. However, the scope of coverage of this patent is not limited to the examples disclosed herein. To the contrary, this patent covers all methods, apparatus, systems, and articles of manufacture fairly falling within the scope of the claims either literally or under the doctrine of equivalents. Like or similar features of the disclosed examples are designated by the same reference numerals in the Figures. Regarding the dots at the end of the reference numeral lines in FIGS. 2, 5 and 6, it should be noted that these designate the end of the reference numeral lines and should not be understood as technical details of the object as shown. The corresponding reference numeral lines with the corresponding end dots in FIGS. 2, 5, and 6 have been drawn to be linear at least in part. These at least partially linear reference numeral lines do not represent any technical details of the object as shown. The dots in FIG. 3A do not represent any technical details of the object as shown either but illustrate a section of the drawing which is shown in FIGS. 3B and 3C in a magnified and perspective manner.

Examples disclosed herein relate to tool changers for changing tools on spindles of machine tools. An example tool changer comprises a tool drum having a plurality of circumferentially disposed tool holders for holding tools, an axle carrier on which the tool drum is rotatably supported for aligning the tool holders with the spindle, and a transmission via which the tool drum can be driven by the spindle of the machine tool for aligning the tool holders.

In addition, examples disclosed herein relate to an example machine tool comprising a spindle stock, a spindle disposed in the spindle stock and a tool changer described above for changing a tool on the spindle, wherein a tool drum of the tool changer can be driven by the spindle of the machine tool via a transmission for aligning the tool holders of the tool drum.

Examples disclosed herein provide a tool changer which has a compact structure and can be driven by the spindle of the machine tool with reduced friction. Some disclosed examples provide a tool changer having a rotatable tool drum that is driven via the spindle without a complicated and friction-prone cam step-down gear wherein it is yet possible to achieve an effective speed reduction from the tool spindle to the tool drum. In other words, such some examples provide a tool changer comprising an efficient, low-friction step-down gear of a simple and compact structure. Some disclosed examples provide a tool changer which does not require providing an exposed spindle gear in the work space of the spindle for driving the tool drum of the tool changer.

Examples disclosed herein comprise a tool changer for changing a tool on a spindle of a machine tool which comprises a tool drum having a plurality of tool holders, that is, in other words, tool holding means for holding tools, an axle carrier on which the tool drum is rotatably supported for aligning the tool holders or tool holding means with the spindle, first coupling means rotatably supported on the axle carrier, and at least one gear stage or gear assembly via which the first coupling means is connected to the tool drum.

According to some disclosed examples, the first coupling means is adapted to be coupled or uncoupled with a second coupling means rotatably supported on a spindle stock of the machine tool and connected to the spindle of the machine tool via at least one second gear stage. Furthermore, the tool drum is adapted to be driven, when the first and second coupling means are in a coupled state, by the spindle of the machine tool via the at least one second gear stage, the second and first coupling means and the at least one first gear stage for aligning the tool holding means.

Thus, according to some disclosed examples, a first coupling means rotatably supported on the axle carrier is provided which is connected to the tool drum via a first gear stage. Thus, it is possible to drive the tool drum via the first coupling means and the first gear stage. In this case, the first gear stage makes efficient and low-friction speed reduction possible when the tool drum is driven via the first coupling means.

Furthermore, according to some disclosed examples, the first coupling means is adapted to be coupled or uncoupled with a second coupling means, the second coupling means being rotatably supported on the spindle stock of the machine tool. Thus, it is made possible to perform the driving of the tool drum via the second coupling means at the spindle stock and it need not be performed via a spindle gear located in the work space of the spindle.

According to some disclosed examples, it is provided that the tool drum is adapted to be driven by the spindle of the machine tool when the first and second coupling means are in a coupled state. According to some disclosed examples, the driving is performed via at least one second gear stage via which the spindle can drive the second coupling means, wherein the second coupling means drives the first coupling means and the at least one first gear stage of the tool changer is driven by the first coupling means and thus drives the tool drum. Thus, it is possible to achieve a further speed reduction by the transmission of the first and second gear stages.

Therefore, based on the connection between the second gear stage, the second and first coupling means and the at least one first gear stage, a compact, efficient low-friction step-down gear can be provided via which the tool drum can be driven by means of the spindle when the speed is reduced. In this case, the second coupling means is rotatably supported on the spindle stock of the machine tool so that the coupling between the first and the second coupling means need not be provided in the work space of the tool spindle. Thus, it is possible to freely adapt the work space of the tool spindle in an advantageous manner, in particular without requiring an exposed spindle gear.

In some preferred examples, the tool holding means are disposed along the circumference of the tool drum about the rotational axis of the tool drum. The tool holding means may be integrally formed with the tool drum or attached to the tool drum. In some preferred examples, the tool holding means comprise tool supporting means for supporting tools or tool gripping means for gripping tools. For example, the tool holding means may be formed as tool clamps.

In some preferred examples, the first coupling means is disposed on the axle carrier on a side opposite a tool changing position on the spindle relative to the rotational axis of the tool drum. This offers the advantage that the first coupling means is disposed in an area of the tool changer that faces away from the work space of the spindle of the machine tool so that the work space of the spindle may remain free and the driving of the tool drum may be done on the opposite side of the tool changer.

According to some preferred examples, the first coupling means is connected to the tool drum via a first gear stage, the first gear stage preferably, but not necessarily, comprising a first gear disposed coaxially with the tool drum and connected to the tool drum in a rotationally fixed manner, and a second gear connected to the first coupling means in a rotationally fixed manner. In some preferred examples, in this case the first gear stage is formed as a bevel gearing.

According to some preferred examples, a particularly compact transmission gear can be provided for driving the tool drum of the tool changer because only a single gear stage having two gears is provided in the tool changer. In this case, the required speed reduction can be performed by the total transmission of the transmissions of the one first gear stage and the at least one second gear stage. An angle of inclination between the rotational axis of the tool drum and the rotational axis of the first coupling means is preferably, but not necessarily, compensated for by a bevel gearing which forms the first gear stage. This means that the first gear and the second gear are preferably, but not necessarily, bevel gears whose clearance angle of which compensates the angle of inclination between the rotational axis of the tool drum and the first coupling means.

According to further preferred examples, the first coupling means is connected to the tool drum via a first gear stage and a third gear stage, wherein the first gear stage preferably, but not necessarily, comprises a first gear disposed coaxially with the tool drum, which is connected to the tool drum in a rotationally fixed manner, and a third gear, the third gear stage preferably, but not necessarily, comprises a second gear connected to the first coupling means in a rotationally fixed manner, and a fourth gear, and the third gear of the first gear stage and the fourth gear of the third gear stage are interconnected in a rotationally fixed manner.

According to some such further preferred examples, a first and a third gear stage are integrated in the tool changer whereby an even higher speed reduction may advantageously be achieved as the total transmission results from the transmissions of the first, second, and third gear stages. Thus, such preferred examples are particularly advantageous for tool changers having a higher number of tool holders on the tool drum, that is, e.g. in case of a reduced angle between adjacent tool holding means of the tool drum. In this case the first gear stage may be formed as a spur or bevel gearing stage and the third gear stage may also be formed as a spur or bevel gearing stage.

According to some preferred examples, the first gear stage is formed as a spur gearing and the third gear stage as a bevel gearing stage. Thus, it is made possible in an advantageous manner to compensate an inclination between the rotational axis of the tool drum and the rotational axis of the first coupling means already by the bevel gearing of the third gear stage so that the connection of the third gear of the first gear stage and the fourth gear of the third gear stage can be provided with a rotational axis parallel to the rotational axis of the tool drum whereby a particularly compact provision of the first and the third gear stage is made possible in the tool changer.

In some preferred examples, the third gear of the first gear stage and the fourth gear of the third gear stage are connected in a rotationally fixed manner via a connecting means, the connecting means being preferably, but not necessarily, supported on the axle carrier so as to be rotatable. This offers the advantage that the structure of the gear stages can be provided in an even more compact manner because both the connection between the first coupling means and the second gear and the connection between the third gear and the fourth gear are rotatably supported on the axle carrier of the tool changer.

In some preferred examples, the first and the second coupling means form an Oldham coupling. Thus, a particularly simple design of the coupling between the first and the second coupling means can be provided, wherein furthermore it is advantageously not necessary to exactly align the rotational axis of the first coupling means and the rotational axis of the second coupling means due to the mode of operation of the Oldham coupling when one of the two coupling means comprises two disks of the Oldham coupling and the other coupling means comprises the third disk of the Oldham coupling. An even simpler design of a coupling between the first and the second coupling means can be provided by a simple groove and tongue joint in which one of the coupling means has a groove and the other coupling means has a tongue. Generally, the coupling between the first and the second coupling means can be made by a frictional connection (friction-type and/or magnetic-type connection) and/or a positive-locking connection, such as in the above-described Oldham coupling or groove and tongue joint.

In some preferred examples, the first coupling means is adapted to be coupled or uncoupled with the second coupling means by moving the spindle stock up and down relative to the axle carrier. This offers the advantage that the coupling or uncoupling of the first with the second coupling means can be done in a particularly simple manner by moving the spindle stock of the machine tool up and down relative to the axle carrier.

In some preferred examples, the at least first gear stage and the second gear stage form a step-down gear. This offers the advantage that a speed reduction can be achieved by a total transmission of the first and the second gear stages. This makes it possible to provide the torque required for rotating the drum via the spindle of the machine tool. Furthermore, this enables a more precise control of the rotation of the tool drum for exactly aligning or positioning the tool holders of the tool drum because a rotation of the tool drum corresponds to a plurality of rotations of the spindle of the machine tool. In this case the transmission ratio is preferably predetermined by the total transmission of the at least one first gear stage and the at least one second gear stage and by the total transmission of the first, second, and third gear stages, respectively.

In some preferred examples, the plurality of tool holders is uniformly disposed along a circumference of tool drum, that is, in a uniform angular spacing at equal angles between respectively adjacent tool holders, and the transmissions of the at least one first gear stage and the second gear stage are preferably provided such that the total transmission is adapted such that in case of a spindle rotation or an integral multiple of a spindle rotation, the tool drum is moved on by one tool holding position, particularly by an angle corresponding to 360° divided by the number of tool holding means.

This enables a particularly simple control of the drum rotation by the spindle drive because a spindle rotation or an integral multiple of a spindle rotation corresponding exactly to the total transmission effects a rotation of the tool drum by an angle corresponding to the angular spacing of the tool holders. This makes it possible in a particularly advantageous manner to exchange the tool drum by a larger or smaller tool drum having a different number of tools without adapting the spindle control because the total transmission can respectively be provided by the gear stages integrated in the tool drum such that a spindle rotation or an integral multiple of a spindle rotation moves the tool drum on by one tool holding position. To this end, it is merely necessary in each case to adapt the transmission of the first gear stage and e.g. the first and the third gear stages, respectively, to the number of the uniformly arranged tool holders without having to adapt the second gear stage.

The second gear stage may have a transmission ratio of, for example, 1:1 or 1:2 so that one spindle rotation leads to one rotation (transmission 1:1) or one half rotation (transmission 1:2) of the second coupling means. Thus, in some preferred example configurations of the coupling as a tongue and groove joint or an Oldham coupling, a spindle rotation advantageously corresponds exactly to one whole or one half rotation of the second coupling means so that a coupling or uncoupling position of the second coupling means can respectively be achieved in case of integral spindle rotations.

In some preferred examples, the rotational axis of the first coupling means in a coupled state with the second coupling means is disposed substantially perpendicular to the spindle axis of the spindle. This enables a particularly simple structure as both the first coupling means and the second coupling means can be provided with rotational axes that are disposed substantially perpendicular to the spindle axis of the spindle. Thus, the second gear stage can be provided in a compact manner and with a simple structure by a bevel gearing with rotational axes that are substantially perpendicular to each other. Furthermore, when the coupling is formed as a tongue and groove joint or an Oldham coupling, a vertical rotational axis of the first and second coupling means in a coupled state allows a simple coupling or uncoupling of the coupling means by relatively moving the first and second coupling means, preferably, but not necessarily, in the displacement direction of the spindle stock of the machine tool.

In some preferred examples, the rotational axis of the tool drum in a coupled state of the first and second coupling means is inclined towards the rotational axis of the first coupling means and the angle of inclination between the rotational axis of the tool drum and the rotational axis of the first coupling means is compensated for by at least one bevel gearing stage of the at least one first gear stage.

In some preferred examples, the axle carrier is adapted to be attached to a fixture of the machine tool by means of an articulation so as to be pivotably supported. This offers the advantage that the tool drum rotatably supported on the axle carrier can be pivoted together with the axle carrier away from and towards the spindle of the machine tool by means of the articulation in order to align a tool holder of the machine tool with the rotational axis of the spindle for changing or exchanging a tool.

According to some disclosed examples, a machine tool comprises a spindle stock, a spindle disposed in the spindle stock, second coupling means rotatably supported on the spindle stock of the machine tool and driven by the spindle of the machine tool via a second gear stage, and a tool changer for changing a tool on the spindle according to at least one of the above-described aspects of disclosed examples. In this case, the first coupling means of the tool changer is adapted according to the invention to be coupled or uncoupled with the second coupling means, and the machine tool is adapted to drive the tool drum for aligning the tool holding means in a coupled state of the first and second coupling means by the spindle via the second gear stage, the second and first coupling means and the at least one first gear stage.

Thus, a disclosed example machine tool of the above-described type has a disclosed example tool changer of at least one or more of the above-described aspects of a tool changer according to examples disclosed herein. In this case, depending on the design of the tool changer, the same advantages can be achieved as described above in the respective preferred example aspects of the tool changer.

In some preferred examples, the spindle stock can be moved up and down relative to the tool changer. This makes it advantageously possible to control a tool changing position of the tool changer by moving the spindle stock up and down.

In some preferred examples, the tool changer is pressed against a radial cam of the spindle stock by means of at least one tension spring, wherein when the spindle stock is moved a guiding means disposed on the axle carrier is guided along the radial cam such that an upward movement of the spindle stock causes a pivoting movement of the axle carrier towards the spindle and a downward movement of the spindle stock causes a pivoting movement of the axle carrier away from the spindle. Thus, a pivoting movement of tool changers towards or away from the spindle can be effected by simply moving the spindle stock of the machine tool up and down. In this case, the guiding means may comprise e.g. one or more rollers disposed on the axle carrier. However, the guiding means may also comprise one or more portions formed on or mounted to the axle carrier that are guided in contact with the radial cam of the spindle stock.

In some preferred examples, the first coupling means is adapted to be coupled or uncoupled with the second coupling means by moving the spindle stock up and down relative to the axle carrier. This enables a particularly simple coupling or uncoupling of the first and second coupling means by moving the spindle stock up and down relative to the axle carrier and the tool changer, respectively.

In some preferred examples, the first and second coupling means are in the coupled state at the top-most position of the spindle stock. This offers the advantage that the coupled state can be controlled in a particularly simple manner because it is reached at the top-most controllable position of the spindle stock.

In some preferred examples, a downward movement of the spindle stock from the top-most position uncouples the first and second coupling means. Thus, the coupling between the first and the second coupling means can be reached in a particularly simple manner by moving the spindle stock down from the top-most position.

In some preferred examples, the machine tool comprises a fixture attached to the machine stand of the machine tool, on which fixture the axle carrier of the tool changer is pivotably supported by means of an articulation. Thus it is possible to provide a particularly simple design of a fixture on which the axle carrier of the tool changer can be supported so as to be pivotable.

Accordingly, examples disclosed herein provide a tool changer that has a compact structure and can be driven by the spindle of the machine tool with reduced friction. Some disclosed examples of a tool changer provide a tool changer comprising a rotatable tool drum driven via the spindle without requiring a complicated and friction-prone cam step-down gear while effective speed reduction from the tool spindle to the tool drum can yet be achieved. The tool changer according to disclosed examples can be provided with an efficient, low-friction step-down gear structured in a simple and compact manner. Furthermore, according to examples disclosed herein, it is not necessary to provide an exposed spindle gear in the work space of the spindle for driving the tool drum of the tool changer.

FIG. 1 shows an illustrated example of schematic partial sectional view of a tool changer 1 according to a first example of examples disclosed herein. The tools 10a, 10b, 10c may be radially supported on or fixed to a tool drum 2 rotatably supported above the axle carrier 3 by means of tool holding clamps 2a, 2b, 2c (tool holders or tool holding means). The axle carrier 3 is pivotably supported by means of an articulation 114a via a fixture 114 attached to the machine stand 110 of the machine tool and pressed against a spindle stock 104 provided with a radial cam 116 via a tension spring 11 (see e.g. FIG. 2). The spindle stock 104 can be moved up and down relative to the machine stand 110, the spindle stock 104 having two laterally mounted slides 113a and 113b which are guided on a guiding rail 112 of the machine stand 110 when the spindle stock 104 is moved up and down.

Figure 2:
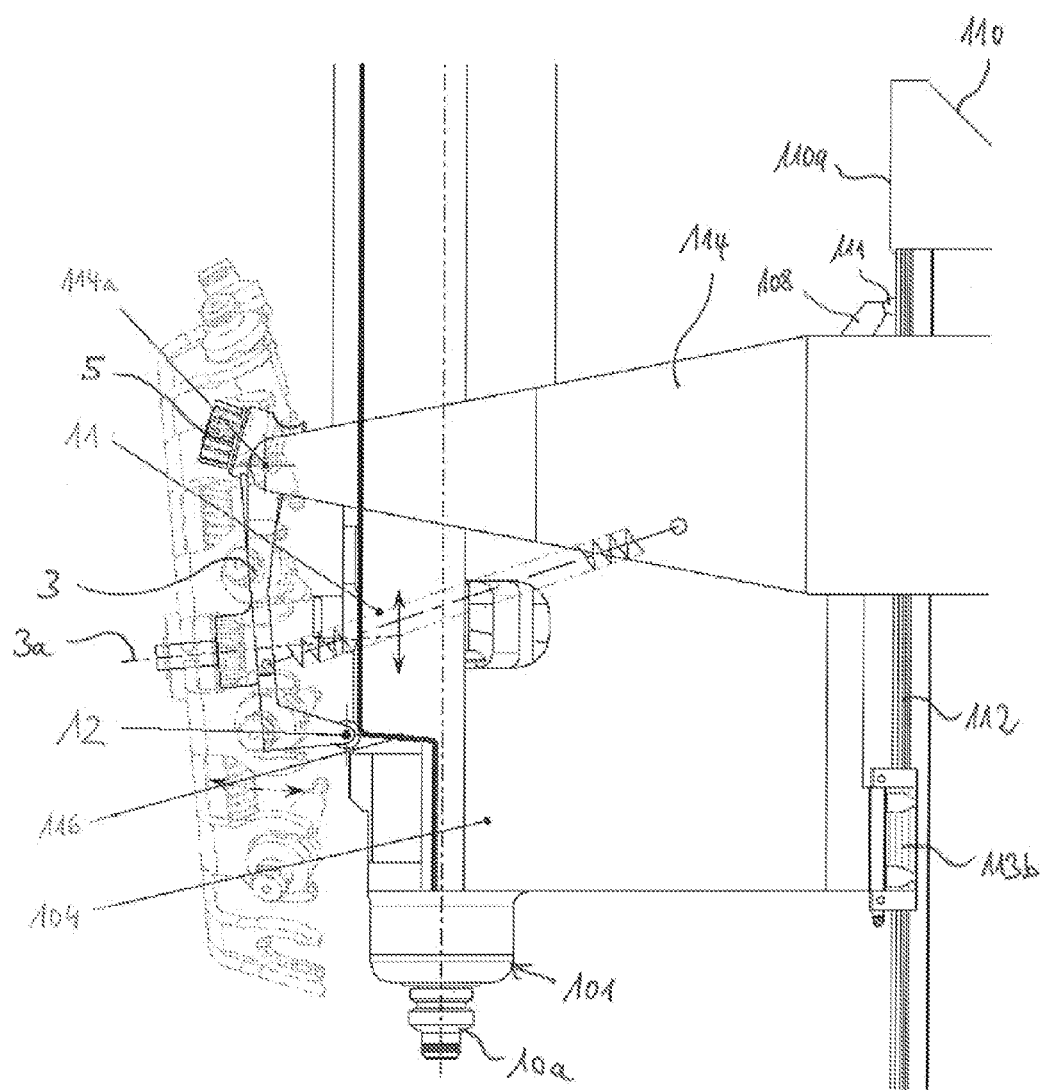
FIG. 2 schematically shows the structure of a control of the pivoting movement of the tool changer according to the first example by moving the spindle stock of a machine tool up and down.

As schematically shown in FIG. 2, the axle carrier 3 in this example has a roller 12 that is guided along the radial cam 116 when the spindle stock 104 is moved up and down, the roller 12 being held to the radial cam 116 of the spindle stock 104 by means of the tension spring 11. A vertical movement of the spindle stock 104 (that is, an upward or downward movement of the spindle stock 104 with the radial cam relative to the tool changer 1) thus effects a pivoting movement of the axle carrier 3 with the tool drum 2 so that a tool clamp 2a or a tool 10a held therein can be brought into the position required for a tool changing operation in which the tool is aligned with the rotational axis 101c of the spindle 101 of the machine tool (as shown, for example, in FIG. 1).

An upward movement of the spindle stock 104 causes the tool drum 2 to pivot towards the work spindle 101 by means of the radial cam 116 and a downward movement of the spindle stock 104 causes the tool drum 2 to pivot away from the spindle 101. The spindle 101 of the machine tool comprises a spindle head 101a with a tool holder 101b for holding a tool. The spindle head 101a is connected to an end portion 103 (shaft connecting piece 103) of the spindle driving shaft via a connecting member 102 so as to be rotationally fixed, via which end portion 103 the spindle 101 is rotationally driven. In this example according to FIG. 1 the tool holder 101b is formed in the illustrated example as a steep taper tool holder. However, examples disclosed herein are not limited to steep taper tool holders. For example, it is also possible to form the tool holder 101b, for example, as a hollow shaft cone tool holder or other types of spindle tool holders.

FIG. 1 shows the tool changer 1 according to the first example at the top-most position of the spindle stock 104 in which the tool 10*a* at the bottom-most position of the tool drum 2 is aligned with the rotational axis 101*c* of the spindle 101 of the machine tool wherein this tool 10*a* can be held in the tool holder 101*b* of the spindle 101 by moving down the spindle stock 104.

For aligning the tool holders 2*a*, 2*b*, 2*c* with the rotational axis 101*c* of the spindle 101, the tool drum 2 is rotatably supported on the axle carrier 3 by means of the bearings 9*a* and 9*b*. Furthermore, a coupling member 6 of a first coupling means is rotatably supported on the axle carrier 3 by means of the bearings 8*a* and 8*b*. The connecting member 6 is connected to a spur gear 5 (second gear) in a rotationally fixed manner. The spur gear 5 forms a first gear stage with a bevel gear 4 (first gear), which is integrated in the tool changer 1. The bevel gear 4 is attached to the tool drum 2 in a rotationally fixed manner or integrated with the latter so as to be rotationally fixed. In FIG. 1 a spur gear 5 connected to the connecting means 6 in a rotationally fixed manner is provided in the illustrated example, however, it is furthermore possible to provide a bevel gear for the connection to the bevel gear 4. It is sufficient if the gears 4 and 5 have a clearance angle that compensates for the angle of inclination between the rotational axis of the connecting member 6 and the rotational axis 3*a* of the tool drum 2.

In the top-most position of the spindle stock 104 shown in FIG. 1 the first coupling means comprising the coupling member 6 of the tool changer 1 is connected to a coupling member 106*a* (second coupling means) which is rotatably supported on the spindle stock 104 of the machine tool by means of the bearings 115*a* and 115*b*. The coupling member 106*a* is connected in a rotationally fixed manner to a bevel gear 106*b* disposed inside the spindle stock 104 which bevel gear 106*b* forms a second gear stage with another bevel gear 105. The bevel gear 105 is connected to the spindle 101 in a rotationally fixed manner. In particular, the bevel gear 105 in FIG. 1 is fixed to the spindle head 101 of the spindle 101 in the illustrated example so as to be rotationally fixed. FIG. 1 shows a coupling state between the first coupling means 6, 6*a*, 7 of the tool changer 1 and the coupling member 106*a* of the second coupling means.

The first coupling means 6, 6*a*, 7 is adapted to be coupled with the second coupling means 106*a* connected to the spindle 101 of the machine tool via the second gear stage 105, 106*b*. In the coupled state of the first and second coupling means 6, 6*a*, 7, 106*a*, the tool drum 2 can be driven by the spindle 101 of the machine tool via the second gear stage 105, 106*b*, the coupling connection between the second and the first coupling means 106*a*, 7, 6*a*, 6 and the first gear stage of the bevel gears 5, 4 for aligning the tool clamps 2*a*, 2*b*, 2*c* and the tools 10*a*, 10*b*, 10*c*, respectively.

In this case, the first coupling means 6, 6*a*, 7 is arranged on the axle carrier 3 on the side opposite the tool changing position on the spindle 101 relative to the rotational axis 3*a* of the tool drum 2 so that the work space of the spindle 101, that is, in the lower area of the spindle 101 in FIG. 1, remains empty at the tool holder 101*b* and has no spindle gearing as usually provided in the prior art.

In the first example shown in FIG. 1 in particular, the first coupling means 6, 6*a*, 7 is connected to the tool drum 2 via a first gear stage consisting of the gears 4 and 5, the bevel gear 4 being coaxially disposed with the tool drum 2 and the spur gear 5 being connected to the coupling member 6 in a rotationally fixed manner. Due to the formation of this first gear stage of the gears 4 and 5 as a bevel gearing with a bevel gear it is possible to compensate for an inclination between the rotational axis 3*c* of the tool drum 2 and the rotational axis of the coupling member 6 disposed perpendicular to the rotational axis 101*c* of the spindle 101. In this case, the rotational axes of the coupling member 106*a* are also positioned perpendicular to the rotational axis 101*c* of the spindle 101. The rotational axis 3*c* of the tool drum 2 has an angle of inclination because the tool drum 2 is pivoted towards the spindle 101 in a coupled state of the first and second coupling means 6, 6*a*, 7, 106*a*.

The first gear stage consisting of the gears 4 and 5 and the second gear stage consisting of the bevel gears 105 and 106*b* together form a step-down gear by which a speed reduction can be achieved when the spindle 101 drives the tool drum 2.

FIGS. 3A to 3C schematically show the mode of operation and details, respectively, of the coupling consisting of the first coupling means 6, 6*a*, 7 and the second coupling means 106*a* according to the first example. In this case, FIG. 3A corresponds to the position of the spindle stock 104 according to FIG. 1, the spindle stock 104 being at the top-most position and the first coupling means 6, 6*a*, 7 being in a coupled state with the second coupling means 106*a*.

As shown in FIG. 3B, the coupling consisting of the first coupling means 6, 6*a*, 7 and the second coupling means 106*a* is formed as an Oldham coupling in this embodiment of the present invention wherein the first coupling means 6, 6*a*, 7 has an outer disk 6*a* and the central disk 7 of the Oldham coupling in the illustrated example and the second coupling means has the other outer disk 106*a* of the Oldham coupling in the illustrated example. If the Oldham coupling is in the vertical position, as shown in FIG. 3C, the coupling means 6, 6*a*, 7 and 106*a* can be uncoupled by moving the spindle stock 104 down. By moving the spindle stock 104 up again, the coupling means 6, 6*a*, 7 and 106 can be recoupled.

During the coupling or uncoupling of the first coupling means 6, 6*a*, 7 and the second coupling means 106*a* the coupling means are aligned such that the groove of the central disk 7 of the first coupling means 6, 6*a*, 7 and the tongue of the outer disk of the second coupling means 106 are aligned vertically, that is, in the movement direction of the spindle stock 104. Thus, it is possible to create a couplable or uncouplable state or to change from a couplable or uncouplable state into another couplable or uncouplable state by a half-integral or integral rotation of the first and/or the second coupling means.

Thus, the transmission of the second gear stage of the bevel gears 105, 106*b* in some preferred example of examples disclosed herein has a transmission ratio of 1:1 or 1:2 so that one spindle rotation of the spindle 101 effects an integral or half-integral rotation of the second coupling means 106*a*. In such examples it is possible to change from a couplable or uncouplable state into another couplable or uncouplable state by an integral rotation of the spindle 101 or a multiple of an integral rotation of the spindle 101. Then the transmission of the first gear stage of the gears 4 and 5 is preferably, but not necessarily, selected such that the total transmission can be provided in such a manner that one rotation of the spindle 101 or an integral multiple of one rotation of the spindle 101 rotates the tool drum 2 by one tool position, that is, in case of tool holders 2*a*, 2*b*, 2*c* disposed uniformly along the circumference of the tool drum 2 by one rotation by an angle corresponding to 360° divided by the number of the uniformly disposed tool holders 2*a*, 2*b*, 2*c*.

In case of a holding capacity of, for example, 14 tools on the tool drum 2 and a reduction ratio of 1:2 of the second gear stage 105, 106*a*, this means a transmission ratio of 1:7 or an integral multiple thereof for the first gear stage of the gears 4 and 5. Thus, in case of a transmission ratio of the first gear stage 4, 5 of 1:7 and a transmission ratio of the second gear stage 105, 106*a* of 1:2 a total transmission ratio of 1:14 results wherein in case of 14 uniformly disposed tool holders 2a, 2b, 2c spaced apart at equal angles, one rotation of the spindle 101 causes one rotation of the tool drum 2 by exactly one tool position.

In this example, the coupling means form an Oldham coupling in which the first coupling means 6, 6a, 7 on the tool changer 1 has one outer disk 6a and the central disk 7 of the Oldham coupling, while the second coupling means 106a has the other outer disk of the Oldham coupling. However, examples disclosed herein are not limited to such designs of an Oldham coupling. Rather, in examples comprising an Oldham coupling the second coupling means 106a at the spindle stock 104 of the machine tool may also have one outer and the central disk of the Oldham coupling while the first coupling means then has the other outer disk of the Oldham coupling. In examples comprising an Oldham coupling the advantage generally results that it is not necessary for the rotational axes of the two coupling means to be exactly positioned towards each other because a positioning slightly deviating from the coaxial positioning does not constrain the function of the coupling. However, examples disclosed herein are further not limited to examples comprising an Oldham coupling. Rather, a particularly simple coupling can already be provided, for example, by a simple tongue and groove joint, wherein, however, an exact positioning of the rotational axes of the first and second coupling means becomes necessary. Apart from positive locking couplings, as described above, it is furthermore also possible to provide a friction-locking coupling (e.g. by traction through frictional force or magnetic or electro-magnetic force). In frictional couplings the coupling may optionally also be additionally controlled via the radial cam 116 (for example via a small horizontal reciprocating movement by means of the radial cam when the coupling means approach).

Figures 4A, 4B:
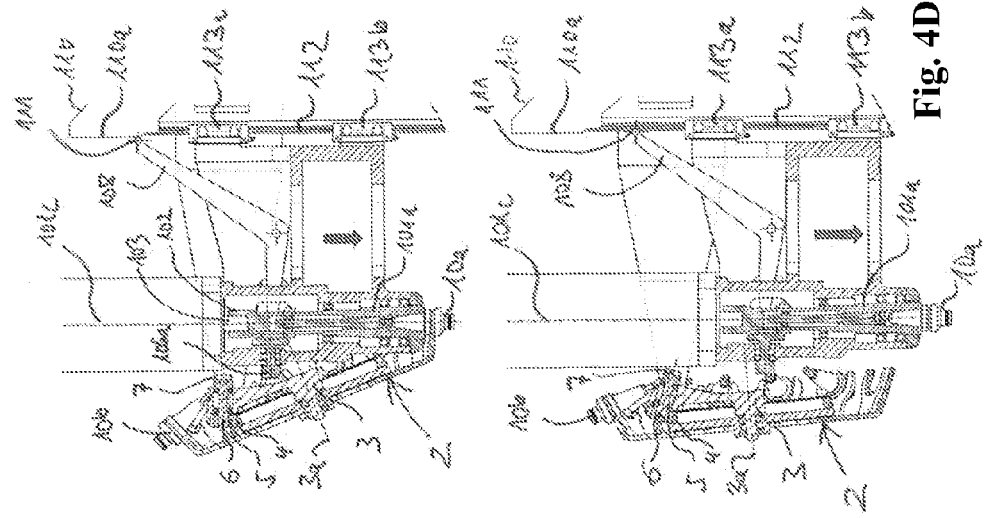
FIGS. 4A, 4B, 4C, and 4D schematically show a changing operation of a tool on the machine tool by means of a tool changer according to the first example.
Figures 4C, 4D:
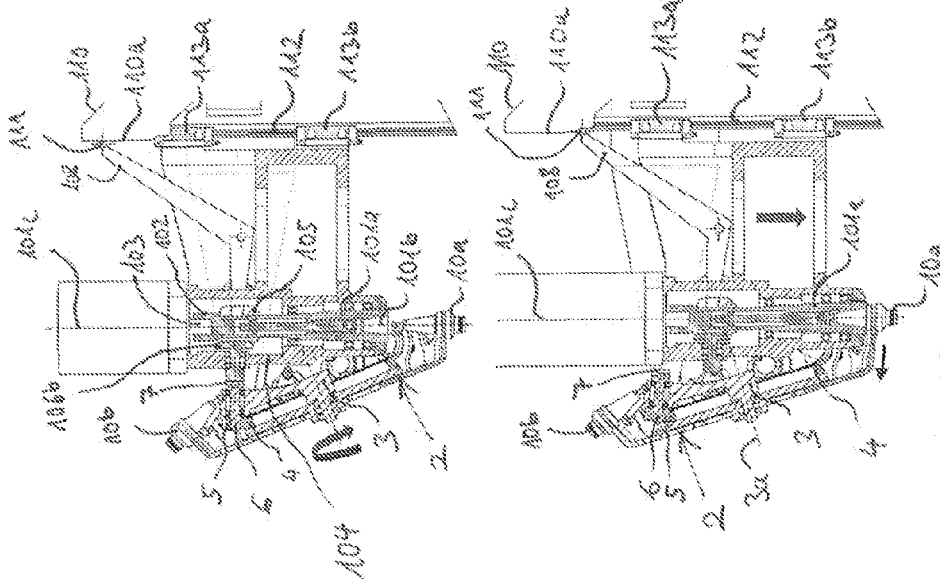

FIGS. 4A to 4D show an illustrated example of a change operation of a tool 10a in the tool holder 101b of the spindle 101 of the machine tool by means of the tool changer 1 according to the first example. In FIG. 4A the spindle stock 104 of the machine tool is at the top-most position and the coupling means 6, 6a, 7, 106a of the coupling are in the coupled state (see also FIG. 1). By rotating the spindle 101a rotation of the tool drum 2 about the rotational axis 3a of the rotatable bearings 9a, 9b on the axle carrier 3 can be rotated (see arrow in FIG. 4A) to align the predetermined tool 10a with the rotational axis 101c of the spindle 101.

After the alignment has been done the tool 10a is held in the tool holder 101b of the spindle 7 by moving the spindle stock 104 down, wherein the coupling connection of the coupling means 6, 6a, 7, 106a is removed first (see FIG. 4B) and the aligned tool 10a is held in the tool holder 101b of the spindle 101. By moving the spindle stock 104 further down, the cooperation of the radial cam 116 with the roller 12 on the axle carrier 3 causes a pivoting movement of the tool drum 2 away from the spindle 101 (see FIGS. 4C and 4D) whereupon the machining of a workpiece can be carried out by means of the tool 10a held in the spindle 101 at a lower position of the spindle stock 104.

The tools 10a, 10b, 10c are clamped in the spindle 101 by a spring assembly. The releasing force required for releasing the tool clamping device and the movement are performed indirectly via the vertical movement of the spindle stock 104. A deflection lever 108 pivotably supported on the spindle stock 104 by means of a bearing 109, whose one side is connected to a spring-biased tool holding or releasing rod 107, is actuated on the other side of the deflection lever 108 by means of a roller 111 supported in the deflection lever 108 and a radial cam 110a located on the machine stand 110 by the vertical movement of the spindle stock 104 (see FIG. 1 and FIGS. 4B to 4D).

Figure 5:
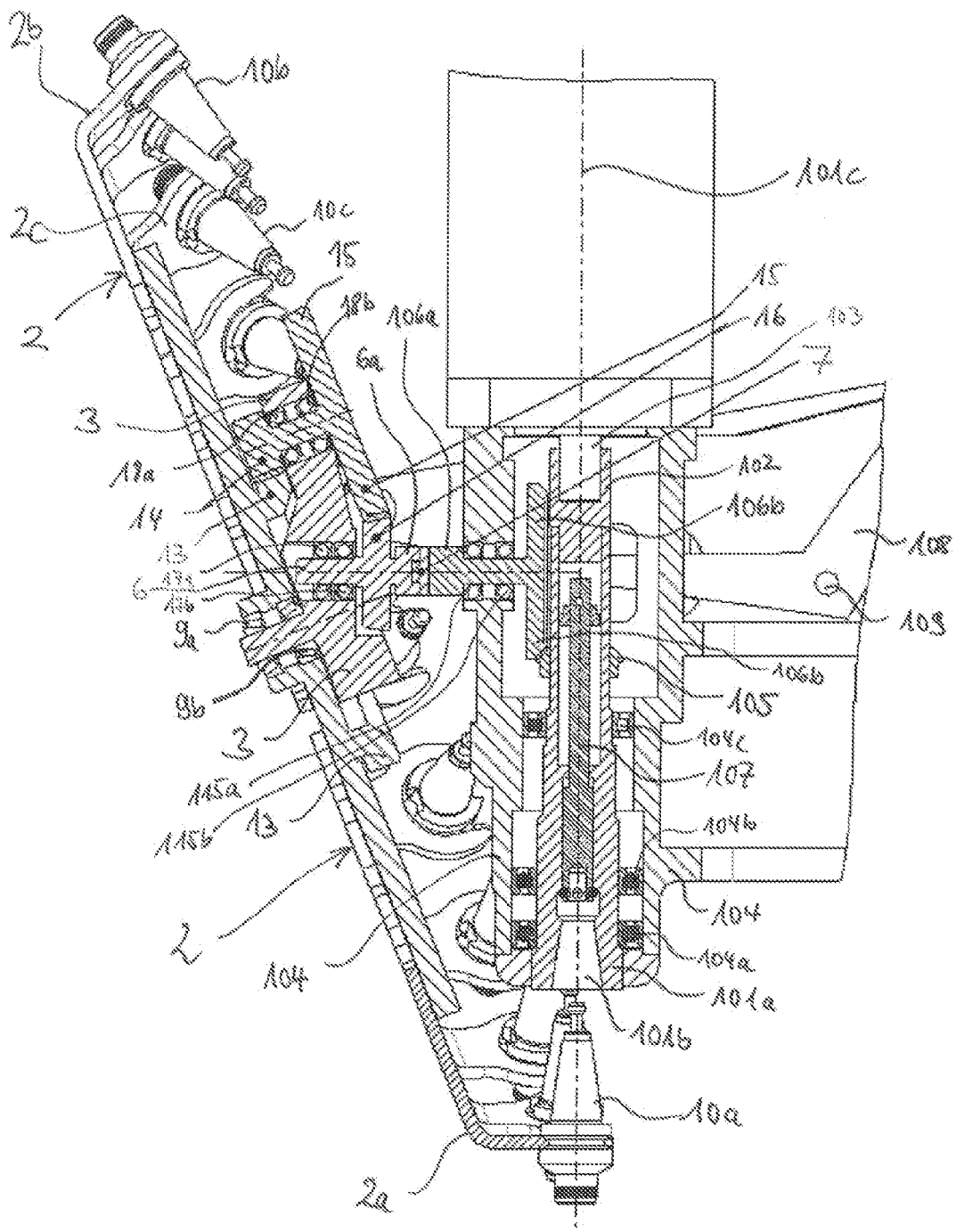
FIG. 5 schematically shows a partial sectional view of a tool changer according to a second example of examples disclosed herein.

FIG. 5 shows an illustrated example of a schematic partial sectional view of a second example of a tool changer according to examples disclosed herein. The tool changer according to the second example differs from the first example by the number of gear stages supported on the axle carrier 3. In this case, according to the example in FIG. 5, a first gear stage 13, 14 is formed as a spur gearing stage, with another gear stage 15, 16 being formed as a bevel gearing stage.

The spur gearing stage comprises two spur gears 13 and 14, the one spur gear (first gear) being connected to the tool drum 2 in a rotationally fixed manner and the other spur gear 14 (third gear) of the spur gearing stage being connected to a bevel gear 15 (fourth gear) of the bevel gearing stage in a rotationally fixed manner and rotationally supported with the former on the axle carrier 3 by means of the bearings 18a and 18b. The other bevel gear 16 (second gear) is attached to the coupling member 6 of the first coupling means 6,6a, 7 in a rotationally fixed manner and rotationally supported on the axle carrier 3 by means of the bearings 17a and 17b.

The bevel gearing stage with the bevel gears 15 and 16 in this case compensates an angle of inclination between the rotational axis 3a of the tool drum 2 and the first coupling means 6, 6a, 7. This makes it possible in an advantageous manner that the rotational axis of the connecting member connecting the spur gear 14 (third gear) of the spur gearing stage with the bevel gear 15 (fourth gear) of the bevel gearing stage in a rotationally fixed manner runs parallel to the rotational axis of the tool drum 2 whereby a particularly compact construction is made possible because the gears 14 and 15 can be disposed in parallel with the tool drum 2 (see FIG. 5). However, examples disclosed herein are not limited to such a configuration, and rather examples can be provided in which the gear stage of the gears 13 and 14 is formed as a spur or bevel gearing stage and the gear stage of the gears 15 and 16 is formed as a spur or bevel gearing stage. In examples in which both gear stages are formed as a bevel gearing stage the bevel gearing stages preferably, but not necessarily, together compensate the angle of inclination between the rotational axis 3a of the tool drum 2 and the rotational axis of the first coupling means 6, 6a, 7.

Figure 6:
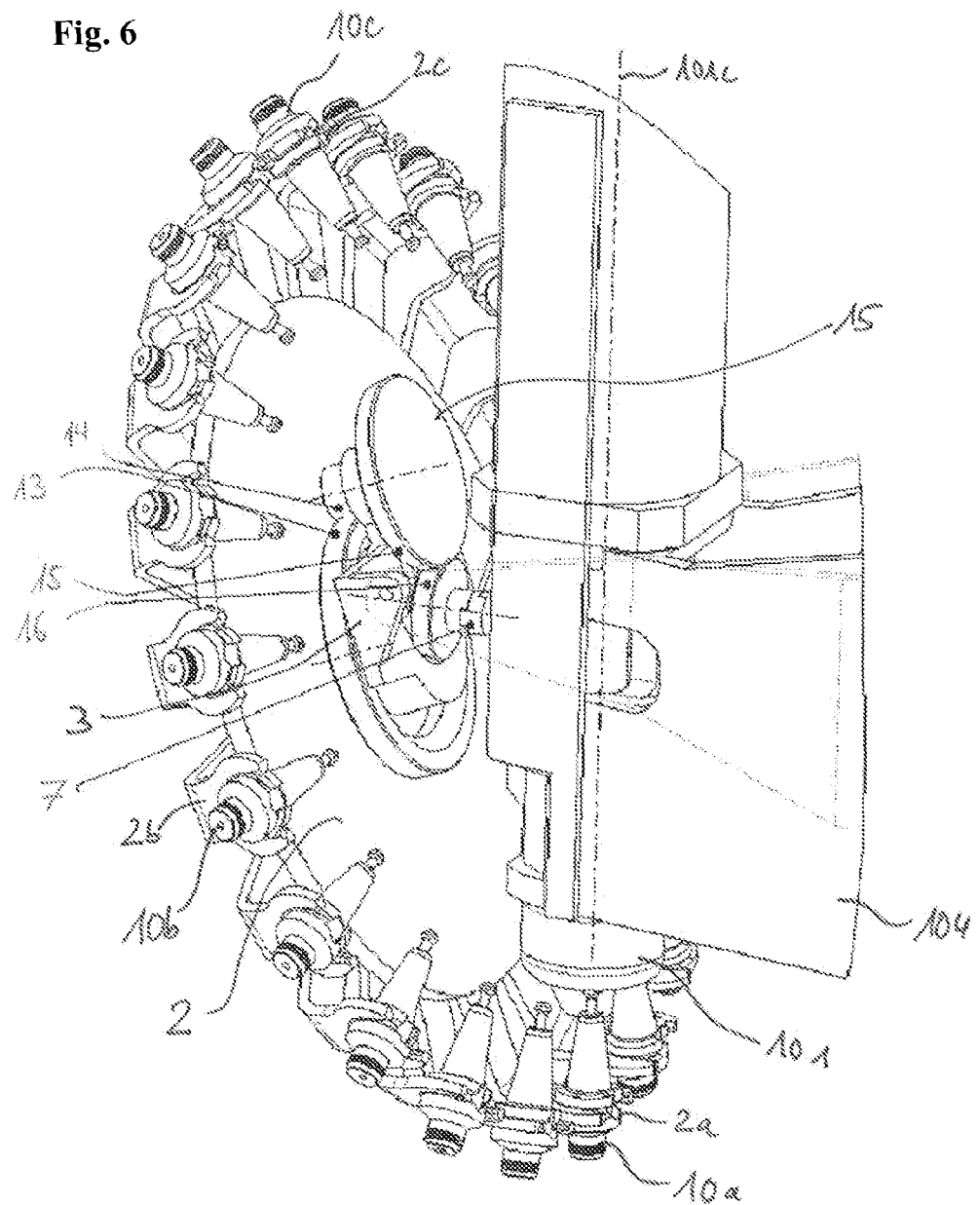
FIG. 6 schematically shows a perspective view of the tool changer according to the second example.

FIG. 6 shows an illustrated example of a schematic perspective view of a tool changer according to the second example. Such a design having two gear stages rotatably supported on the axle carrier 3 can provide a reduction in a high number of tool holders 2a, 2b, 2c on the tool drum 2 in a particularly compact manner due to the two cooperating transmissions. In this case, the total transmission results from the cooperation of the transmissions of the gear stage 105, 106a (second gear stage) on the spindle 101 and the two gear stages (first and third gear stage) integrated in the tool changer. Thus, the tool changer according to the second example is particularly suited for tool drums having a large number of tool holders with small angular spacing, that is, with a small angle between adjacently disposed tool holders.

In case of a holding capacity of, for example, 21 tools on the tool drum 2 and a reduction ratio of 1:2 of the second gear stage 105, 106a, this means a transmission ratio of 1:10.5 or an integral multiple thereof for the two gear stages of the gears 13, 14, 15 and 16. Thus, for a transmission ratio of 1:10.5 of the two gear stages 13, 14, 15 and 16 and a transmission ratio of the second gear stage 105, 106a of 1:2, a total transmission of 1:21 results wherein in case of 21 uniformly disposed tool holders 2a, 2b, 2c spaced apart at equal angles one rotation of the spindle 101 causes a rotation of the tool drum 2 by exactly one tool position.

Figure 7:
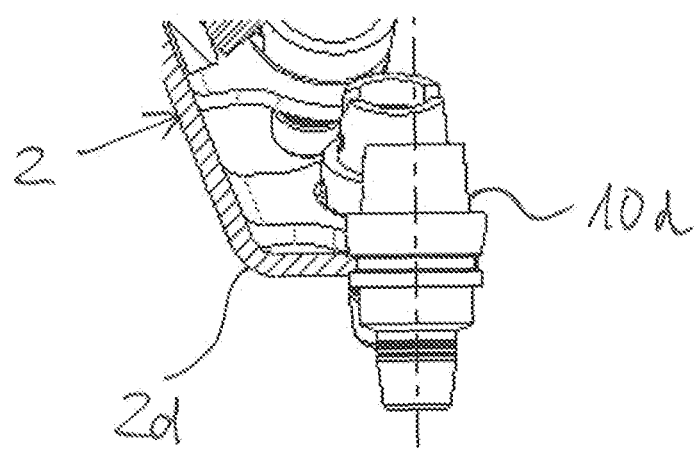
FIG. 7 shows a tool clamp of a tool changer containing a tool according to another example of examples disclosed herein.

FIG. 7 shows a tool clamp 2d of a tool changer according to a further example of examples disclosed herein with a tool 10d held in the tool clamp 2d. In the above-described FIGS. 1, 2, 3A-3C, 4A-4C, 5 and 6, tools 10a, 10b, 10c are held in tool clamps 2a, 2b, 2c disposed along the circumference of the tool drum 2. The tools 10a, 10b, 10c are formed such that they can be held in a steep taper tool holder 101b of the spindle 101. However, examples disclosed herein are not limited to examples comprising steep taper tool holders 101b of the spindle 101. Other tool holder interfaces are also possible. FIG. 7, for example, shows a tool 10d which is suitable for accommodation on the spindle 101 by means of an HSC (HSC for hollow shaft cone). In such an example an HSC tool holder will be provided on the spindle 101. The other modes of operation of the tool changer can be provided as in the above-described examples.

In summary, examples disclosed herein provide tool changers having compact structures which can be driven with reduced friction by spindles of machine tools. Examples disclosed herein of tool changers provides a tool changer having a rotatable tool drum that is driven via the spindle without requiring a complicated and friction-prone cam step-down gear in which it is yet possible to achieve an effective speed reduction from the tool spindle to the tool drum. The tool changer according to disclosed examples may be provided with an efficient, low-friction step-down gear which is simply and compactly structured. Furthermore, it is not required according to disclosed examples to provide an exposed spindle gear in the work space of the spindle for driving the tool drum of the tool changer.

Although certain methods, apparatus, systems, and articles of manufacture have been disclosed herein, the scope of coverage of this patent is not limited thereto. To the contrary, this patent covers all methods, apparatus, systems, and articles of manufacture fairly falling within the scope of the claims either literally or under the doctrine of equivalents.

LIST OF REFERENCE NUMERALS

1 tool changer
2 tool drum
2a, 2b, 2c tool clamp (tool holding means)
3 axle carrier
3a rotational axis of the axle carrier
4 bevel gear (first gear)
5 spur gear (second gear)
6 coupling member
6a outer disk of an Oldham coupling
7 central disk of an Oldham coupling
8a, 8b bearing
9a, 9b bearing
10a, 10b, 10c tool
11 tension spring
12 roller
13 spur gear (first gear)
14 spur gear (third gear)
15 bevel gear (fourth gear)
16 bevel gear (second gear)
17a, 17b bearing
18a, 18b bearing
101 spindle
101a spindle head
101b tool holder of the spindle
101c rotational axis of the spindle
102 connecting member
103 end portion of the driving shaft
104 spindle stock
104a, 104b, 104c bearing
105 bevel gear
106a coupling member
106b bevel gear
107 releasing rod
108 deflection lever
109 bearing
110 machine stand
110 radial cam (on the machine stand)
111 roller
112 guiding rail
113a, 113b slide
114 fixture
114a articulation
115a, 115b bearing
116 radial cam (on the spindle stock)

What is claimed is:

1. A tool changer for changing a tool on a spindle of a machine tool, comprising:
    a tool drum having a plurality of tool holders to hold tools adapted to be received by the spindle when the spindle is in a tool receiving position;
    an axle carrier to rotatably support the tool drum, the axle carrier to rotate about a rotational axis of the tool drum;
    a first coupling portion rotatably supported on the axle carrier; and
    a first gear stage to couple the first coupling portion and the tool drum,
    wherein the first coupling portion is adapted to be coupled or uncoupled with a second coupling portion that is rotatably supported on a spindle stock of the machine tool, the second coupling portion being connected to the spindle of the machine tool via a second gear stage, and
    wherein the tool drum is adapted to be driven by the spindle of the machine tool via the second gear stage when the first and second coupling portions are in a coupled state, the second and first coupling portions, and the first gear stage to align a longitudinal axis of the tool coupled to one of the tool holders relative to a rotation axis of the spindle when the spindle is in the tool receiving position,
    the first and the second coupling portions forming a non-gear positive-locking connection when the first and second coupling portions are in the coupled state, the first and second coupling portions to be coupled and uncoupled by moving the second coupling portion relative to the first coupling portion in a displacement direction of the spindle stock of the machine tool.

2. The tool changer according to claim 1, wherein the first coupling portion is disposed on the axle carrier, with respect to the rotational axis of the tool drum, on a side opposite to the tool receiving position of the spindle.

3. The tool changer according to claim 1, wherein the first gear stage includes a first gear disposed coaxially with the tool drum and connected to the tool drum in a rotationally fixed manner, and a third gear connected to the first coupling portion in a rotationally fixed manner.

4. The tool changer according to claim 3, wherein the first gear stage is formed as a bevel gear stage.

5. The tool changer according to claim 1, wherein the first coupling portion is connected to the tool drum via the first gear stage and a third gear stage, wherein
    the first gear stage comprises a first gear and a third gear, the first gear having a rotation axis coaxial with the rotational axis of the tool drum and is connected to the tool drum in a rotationally fixed manner, the third gear stage comprises a second gear and a fourth gear, the second gear being connected to the first coupling portion in a rotationally fixed manner and the third gear of the first gear stage and the fourth gear of the third gear stage are interconnected so as to be rotationally fixed.

6. The tool changer according to claim 5, wherein the first gear stage is formed as a spur gear stage and the third gear stage is formed as a bevel gear stage.

7. The tool changer according to claim 5, wherein the third gear of the first gear stage and the fourth gear of the third gear stage are interconnected via a connector rotatably supported on the axle carrier.

8. The tool changer according to claim 1, wherein the first coupling portion is adapted to be coupled or uncoupled with the second coupling portion by moving the spindle stock up and down relative to the axle carrier.

9. The tool changer according to claim 1, wherein the first gear stage and the second gear stage form a step-down gear drive.

10. The tool changer according to claim 1, wherein the plurality of tool holders is uniformly disposed along a circumference of the tool drum and transmission ratios of at least one of the first gear stage or the second gear stage provide a total transmission ratio to cause a spindle rotation or an integral multiple of a spindle rotation to move the tool drum by one tool holding position.

11. The tool changer according to claim 1, wherein a rotational axis of the first coupling portion is positioned substantially perpendicular to the rotation axis of the spindle when the first and second coupling portions are in the coupled state.

12. The tool changer according to claim 11, wherein the rotational axis of the tool drum is inclined towards the rotational axis of the first coupling portion when the first and second coupling portions are in the coupled state and an angle of inclination between the rotational axis of the tool drum and the rotational axis of the first coupling portion is compensated by a bevel gear of the first gear stage.

13. The tool changer according to claim 1, wherein the axle carrier is pivotally coupled to a fixture of the machine tool by an articulation.

14. The machine tool according to claim 1, wherein the non-gear positive locking connection includes a groove-and-tongue coupling such that one of the first or second coupling portions includes a tongue and the other one of the first or second coupling portions includes a groove to receive the tongue.

15. The machine tool according to claim 1, wherein the non-gear positive locking connection includes at least one of a frictional coupling, a magnetic coupling, or an electromagnetic coupling.

16. A tool changer for changing a tool on a spindle of a machine tool, comprising:
a tool drum having a plurality of tool holders to hold tools;
an axle carrier to rotatably support the tool drum, the axle carrier to rotate about a rotational axis of the tool drum;
a first coupling portion rotatably supported on the axle carrier; and
a first gear stage to couple the first coupling portion and the tool drum, the first coupling portion being adapted to be coupled or uncoupled with a second coupling portion that is rotatably supported on the spindle stock of the machine tool, the second coupling portion being connected to the spindle of the machine tool via a second gear stage, the tool drum to be driven via a spindle of the machine tool via the second gear stage when the first and second coupling portions are in a coupled state, the second and first coupling portions, and the first gear stage to align a longitudinal axis of one of the tools relative to a rotation axis of the spindle when the spindle is in a tool receiving position, wherein the first and the second coupling portions form an Oldham coupling.

17. A machine tool, comprising
a spindle stock;
a spindle disposed in the spindle stock;
a second coupling portion rotatably supported on the spindle stock of the machine tool and connected to the spindle of the machine tool via a second gear stage to be driven by the spindle of the machine tool; and
a tool changer to change a tool on the spindle, the tool changer comprising:
a tool drum having a plurality of tool holders to hold tools adapted to be received by the spindle when the spindle is in a tool receiving position;
an axle carrier, on which the tool drum is rotatably supported, to rotate about a rotational axis of the tool drum; and
a first coupling portion rotatably supported on the axle carrier and coupled to the tool drum via a first gear stage;
wherein the first coupling portion of the tool changer is adapted to be coupled or uncoupled with the second coupling portion; and
wherein the machine tool is to drive the tool drum via the spindle to align a longitudinal axis of one of the tool holders relative to a rotation axis of the spindle when the spindle is in the tool receiving position and when the first coupling portion is coupled to the second coupling portion to operatively couple the first stage gear and the second stage gear; and
a non-gear positive-locking connection formed between the first and second coupling portions in a coupled state, the first and second coupling portions to move between the coupled state and an uncoupled state by moving the second coupling portion relative to the first coupling portion in a displacement direction of the spindle stock of the machine tool, the first and second coupling portions operatively coupling the first stage gear and the second stage gear in the coupled state and the first and second coupling portions to uncouple the first gear stage and the second gear stage in the uncoupled state.

18. The machine tool according to claim 17, wherein the spindle stock can be moved up and down relative to the tool changer.

19. The machine tool according to claim 18, wherein the tool changer is to be pressed against a radial cam of the spindle stock by at least one tension spring, wherein when the spindle stock is moved a guide disposed on the axle carrier is guided along the radial cam such that an upward movement of the spindle stock causes a pivoting movement of the axle carrier towards the spindle and a downward movement of the spindle stock causes a pivoting movement of the axle carrier away from the spindle.

20. The machine tool according to claim 18, wherein the first coupling portion is adapted to be coupled or uncoupled with the second coupling portion by moving the spindle stock up and down relative to the axle carrier.

21. The machine tool according to claim 20, wherein the first and second coupling portions are adjacent an upper-most position of the spindle stock when the first and second coupling portions are in the coupled state.

22. The machine tool according to claim 21, wherein a downward movement of the spindle stock from the uppermost position causes the second coupling portion to uncouple from the first coupling portion.

23. The machine tool according to claim 17, further comprising a fixture attached to a machine stand of the machine tool, the axle carrier of the tool changer is pivotably supported on the fixture by an articulation.

* * * * *